Figure 1:
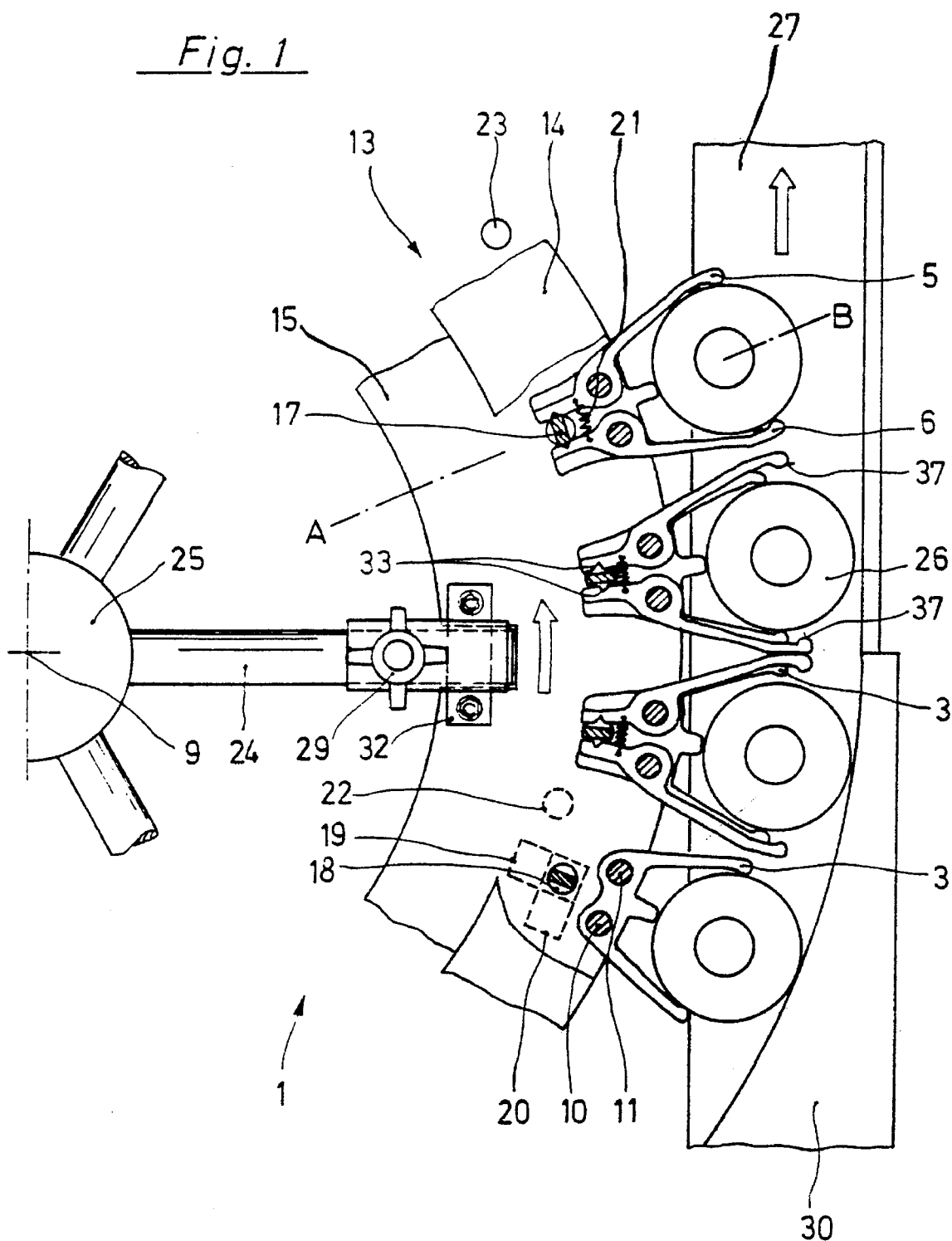

United States Patent [19]
Hermann Kronseder

[11] Patent Number: 5,607,045
[45] Date of Patent: Mar. 4, 1997

[54] TRANSPORT STAR UNIT FOR CONTAINERS

[76] Inventor: E. H. Hermann Kronseder, Regensburger Strabe 42, D-93086, Worth/Donau, Germany

[21] Appl. No.: 590,453

[22] Filed: Jan. 23, 1996

[30] Foreign Application Priority Data

Feb. 7, 1995 [DE] Germany .......................... 295 01 897.6
Sep. 5, 1995 [DE] Germany .......................... 295 14 099.2
Sep. 30, 1995 [DE] Germany .......................... 195 36 692.1

[51] Int. Cl.⁶ ................................................. B65G 47/86
[52] U.S. Cl. ..................... 198/476.4; 198/479.1; 198/803.9
[58] Field of Search ............................ 198/478.1, 479.1, 198/482.1, 483.1, 476.1, 803.9

[56] References Cited

U.S. PATENT DOCUMENTS

| | | | |
|---|---|---|---|
| 3,124,232 | 3/1964 | Humen ................................. | 198/470.1 |
| 3,710,928 | 1/1973 | van Zijp . | |
| 4,172,514 | 10/1979 | Shantz et al. ........................ | 198/470.1 |
| 4,235,328 | 11/1980 | Marshall ........................... | 198/470.1 X |
| 4,512,456 | 4/1985 | Peyton ................................. | 198/470.1 |
| 4,651,879 | 3/1987 | Harris et al. . | |
| 4,984,680 | 1/1991 | Hamano ............................... | 198/803.9 |

FOREIGN PATENT DOCUMENTS

| | | |
|---|---|---|
| 0039976 | 4/1981 | European Pat. Off. . |
| 1482616 | 1/1969 | Germany . |
| G8914924.6 | 10/1989 | Germany . |
| G9301126 | 1/1993 | Germany . |

Primary Examiner—D. Glenn Dayoan
Attorney, Agent, or Firm—Tilton, Fallon, Lungmus & Chestnut

[57] ABSTRACT

In a transport star for containers with a rotatable basic body and several gripper tongs mounted on its circumference, which are formed by clamps in the form of double-levers, a rotatable, lifter is provided mounted between the counter-arms of radially inward-facing associated clamps, and the lifter forces the two adjacent counterarms apart in at least one angular or closed position and allows the counterarms to come together in at least one other angular or open position. In this way, low production costs, high operating safety, and universal application possibilities are achieved.

20 Claims, 6 Drawing Sheets

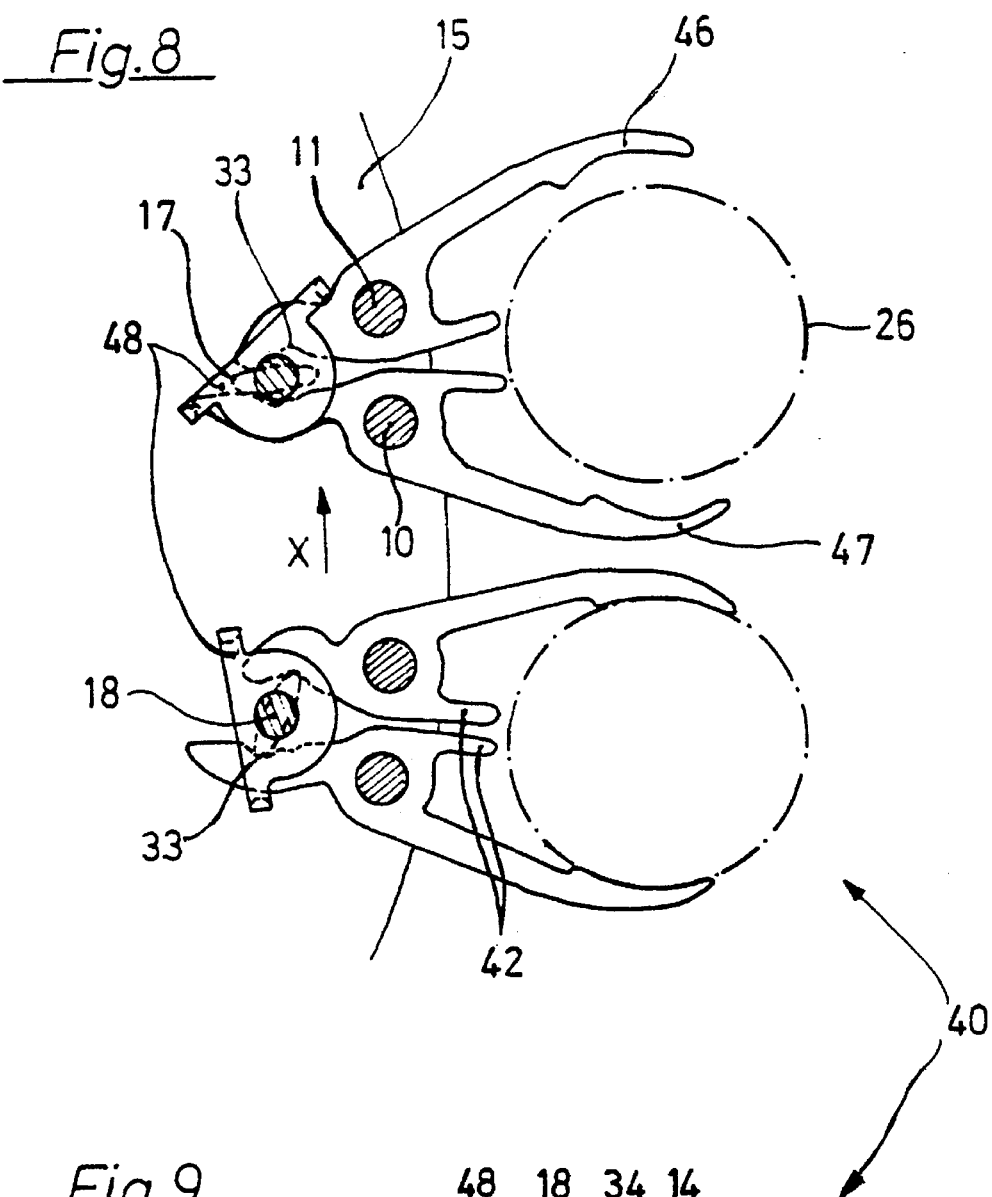
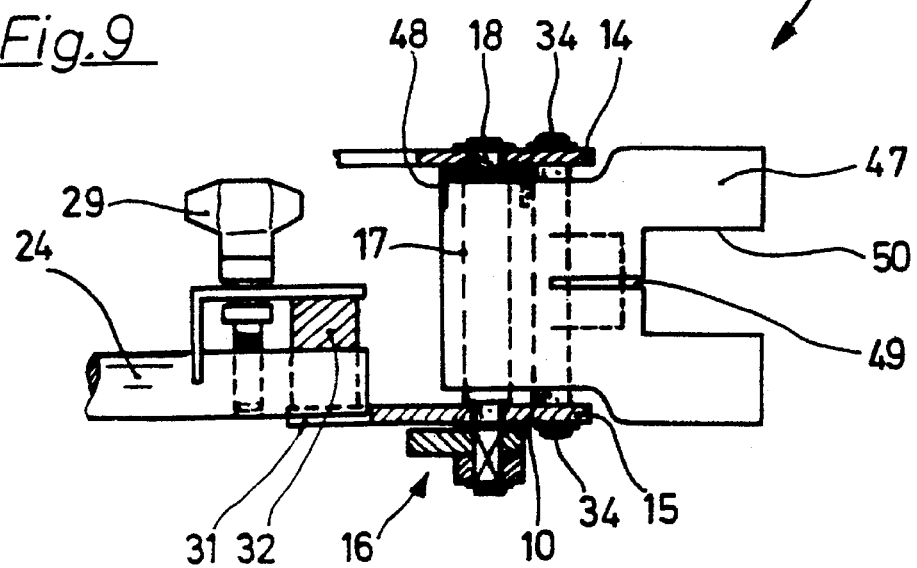

TRANSPORT STAR UNIT FOR CONTAINERS

DESCRIPTION

The invention relates to a transport star for containers.

Such a transport star is already known in which each snap body is formed by two levers arranged as a type of wedge which are borne by a plug which can be pivoted and which can be snapped open elastically by a spring (German Patent No. 1,482,616). The plug is mounted in the basic body and can be shifted radially, and is forced elastically inwards in the open position by another spring. The plugs of the gripping tongs to be closed are moved radially outwards against the spring force by a fixed control curve, whereby the snap bodies move in between the counterarms. The latter are prestressed in the open position by another spring.

This known transport star has high production costs due to the multiplicity of levers, joints, springs, etc., as well as due to the through-going closing curve. The susceptibility to breakdown, particularly with the intrusion of chips and fragments of containers or the like, is great; the exchange of damaged parts is difficult and time-consuming. The area of application is small.

The objective of the invention is to essentially improve the transport star of the type named above with regard to production costs, operating safety, and application options.

The objective of the invention is accomplished in part by utilizing an adjustably mounted control device with a snap body which forces apart the counterarms of a container clamp.

One alternative embodiment of the present invention makes possible in a particularly simple manner, a self-maintenance of the lifters in the closed position and thus avoids a through-going closing curve, and a further alternative embodiment makes possible a fixation of the open position without the use of spring elements which are susceptible to breakdown. In all, the subclaims indicate the universal application area of a transport star according to the invention.

Figure 2:
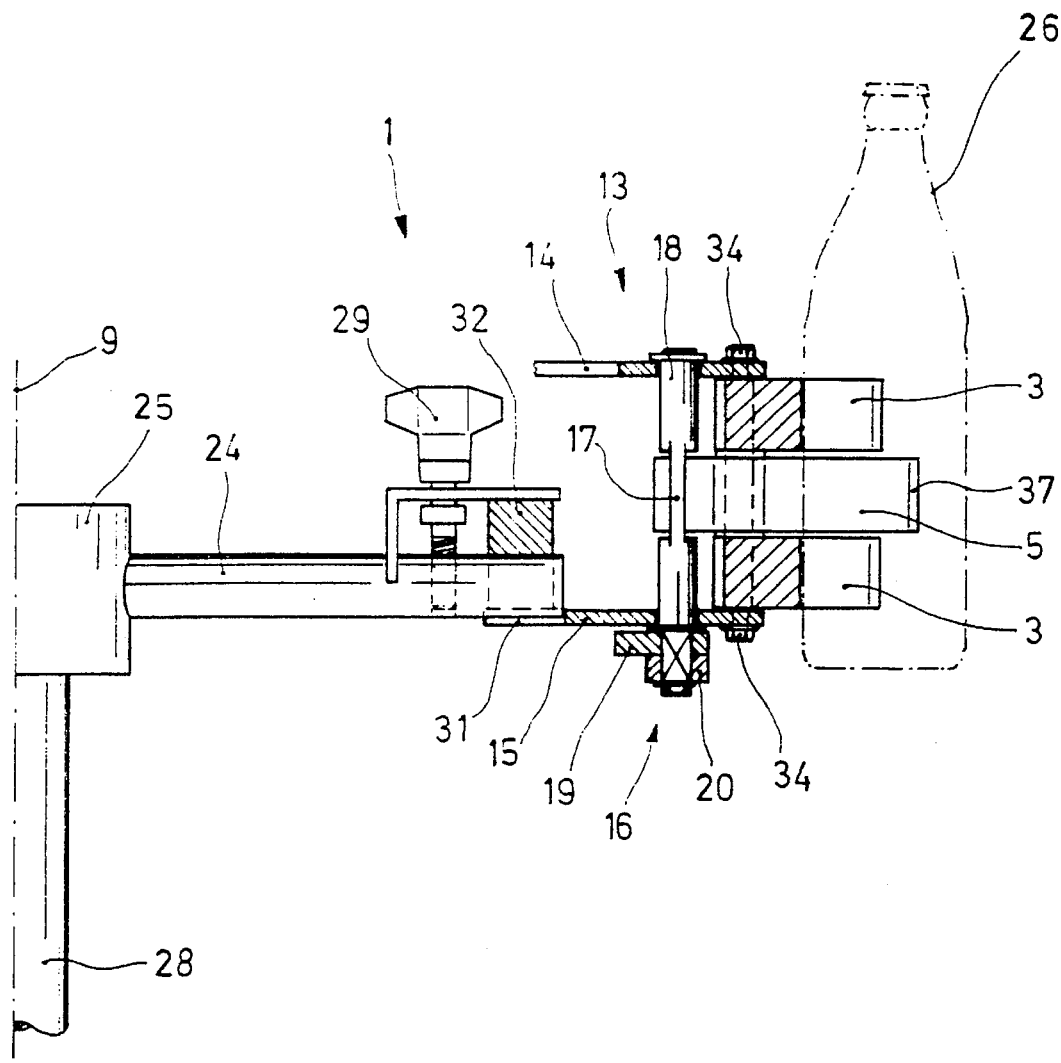
Figure 3:
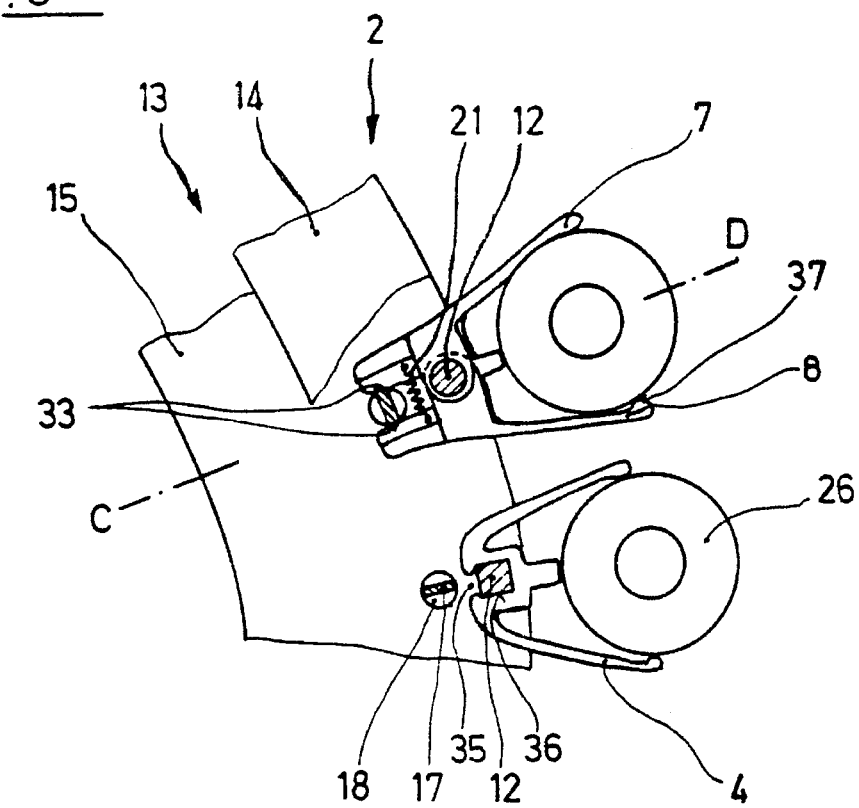
Figure 4:
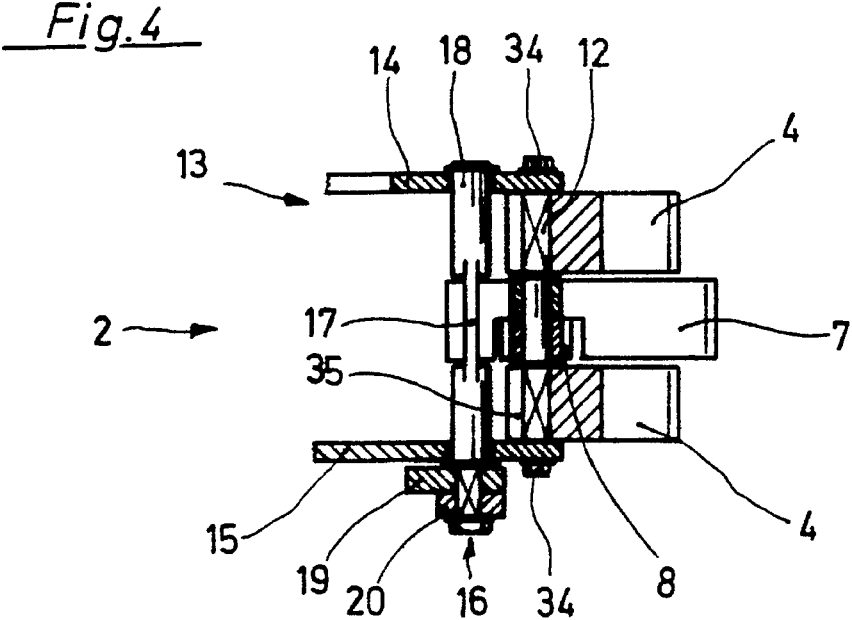
Figure 5:
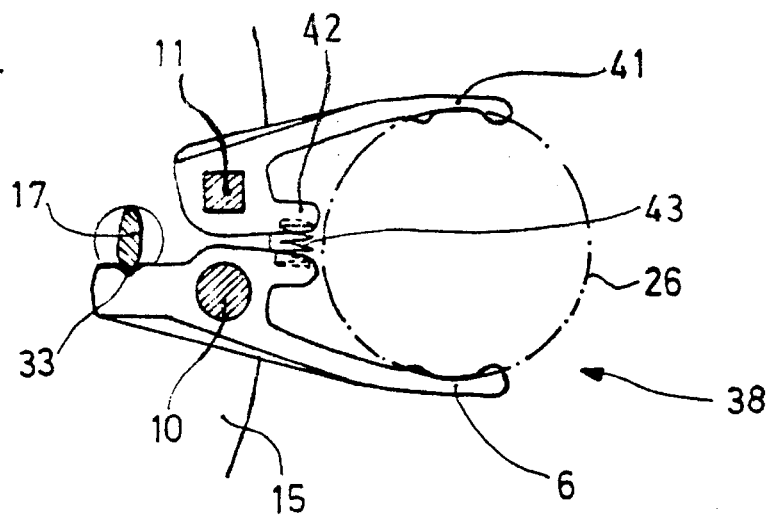
Figure 6:
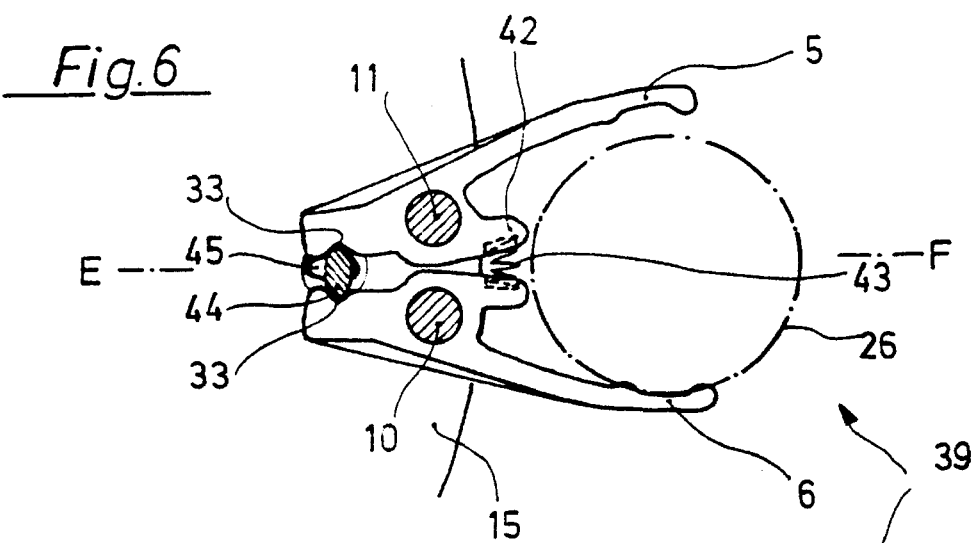
Figure 7:
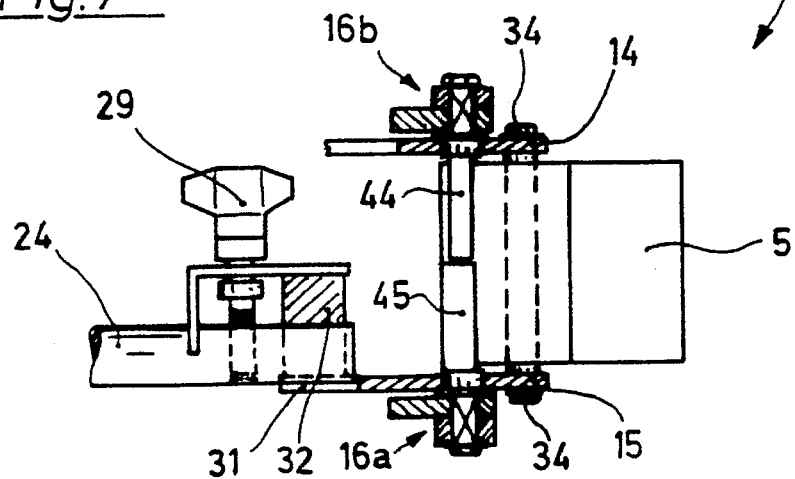
Figure 10:
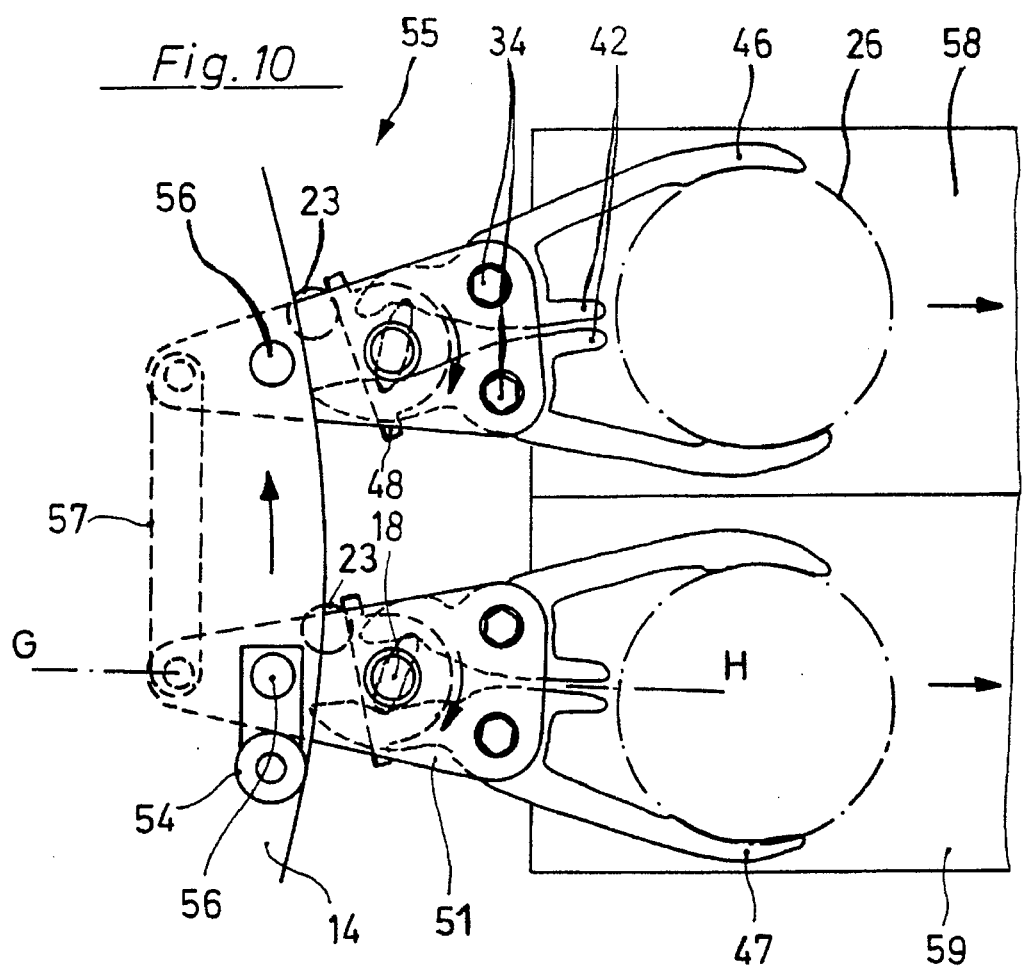
Figure 11:
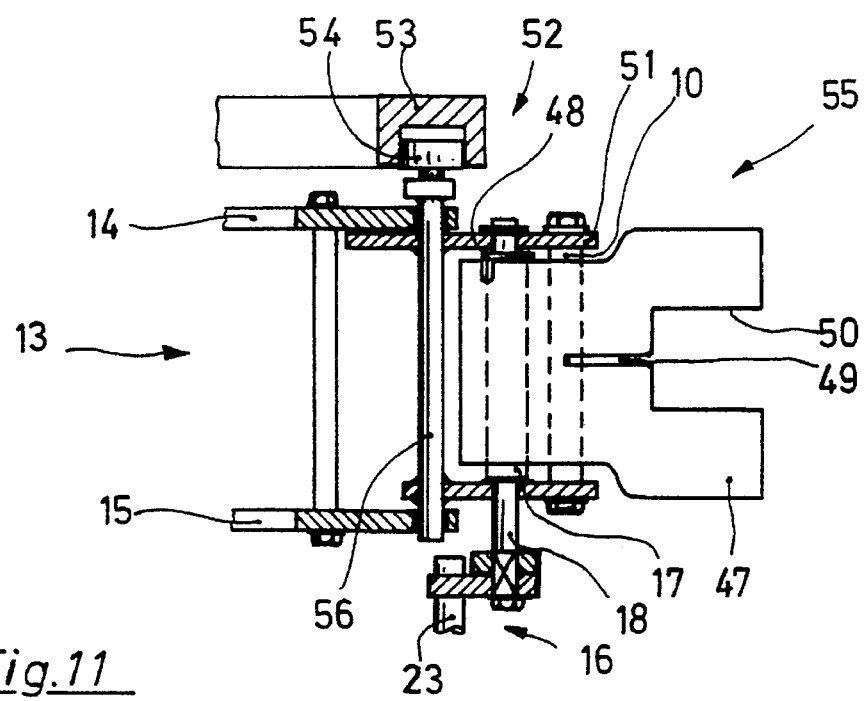

In the following, several embodiment examples of the invention will be described on the basis of the drawings. Shown are:

FIG. 1, a partial view from above of a first embodiment form of a transport star, FIG. 2, the cut A–B according to FIG. 1, FIG. 3, a partial view from above of a second embodiment form of a transport star, FIG. 4, the cut C–D according to FIG. 3, FIG. 5, a partial view from above of a third embodiment form of a transport star, FIG. 6, a partial view from above of a fourth embodiment form of a transport star, FIG. 7, the cut E–F according to FIG. 6, FIG. 8, a partial view from above of a fifth embodiment form of a transport star, FIG. 9, the view X according to FIG. 8, FIG. 10, a partial view from above of a sixth embodiment form of a transport star, FIG. 11, the cut G–H according to FIG. 10.

Transport star 1 according to FIGS. 1 and 2 is designed for the transport and sorting of upright containers in the form of bottles 26. It is integrated in the output of a bottle treatment machine, for example, an inspection machine, of which only the output arch 30, the normal conveyor 27, and a drive shaft 28 for transport star 1 are represented.

Transport star 1 has basic body 13 which consists essentially of two parallel, circular rings 14, 15. The two rings 14, 15 have the same outer diameter. The inner diameters are different, whereby the inner diameter of upper ring 14 is smaller than the inner diameter of lower ring 15.

The two rings 14, 15 are arranged concentrically and are connected rigidly with one another by a number of pairs of pins 10, 11, which have a circular cross section, distributed over the circumference of the rings. Here, each pin 10, 11 is fixed between the two rings 14, 15 so that it can individually be loosened, by means of two bolts 34.

Lower ring 15 has several rectangular reliefs 31 on its inner side, evenly distributed over its circumference, which are covered by bridge-shaped holding blocks 32. Holding blocks 32 fastened to ring 15 sit loose on the ends of radial arms 24 of hub 25 which itself is fastened to drive shaft 28. By means of several manually operatable clamping devices 29, basic body 13 can be clamped onto arms 24, such that it can be loosened, and is oriented by its central axis 9 concentrically to drive shaft 28.

Two identical bins 3 in the form of divided plastic molded parts sit on each pair of associated, adjacent pins 10, 11. Bins 3 have a U-shape whereby the two side limbs together with a lug formed on the middle limb form the actual star bin which is adapted to the container diameter and encompasses the latter not more than 180°. Furthermore, two parallel boreholes are formed in the middle limb of each bin 3 by which bin 3 attaches tightly onto pins 10, 11. Upper bin 3 connects to upper ring 14 and lower bin 3 directly to lower ring 15, whereby clearance remains on pins 10, 11 which corresponds approximately to the height of bin 3.

Between bins 3, clamp 5, 6 is mounted so that it can pivot, on each pin 10, 11, and the clamps are of one piece, shaped from tough-elastic plastic. Clamps 5, 6 of a pair of pins 10, 11 are designed as mirror images in the manner of articulated levers. The levers which are oriented radially outwards serve as gripping arms and together form gripping tongs which stretch around bottle 26 sitting in associated bin 3, by more than 180°. The two levers oriented radially inwards form counterarms to which tension spring 21 is fastened. The latter pulls the counterarms together and thus attempts to open the gripping tongs formed by two associated clamps 5, 6.

Parallel to each pair of pins 10, 11 and namely, centrally between the counterarms of associated clamps 5, 6, a rotatable control shaft 18 is mounted in each ring 14, 15. The control shaft has lifter 17 at the height of the counterarms, which has an oval cross section, and which is formed directly by two parallel flattened areas of control shaft 18. If lifter 17 lies with its parallel side surfaces radial to central axis 9 of transport star 1, it then defines the open position of its clamps 5, 6, because in this case, the counterarms are brought to maximum closeness by tension springs 21 and thereby, the gripping arms are removed to the maximum distance from one another. In the open position, bottle 26 can enter bin 3 uninhibited. If lifter 17 lies with its parallel side surfaces tangential to central axis 9 of transport star 1, it then defines the closed position of its clamps 5, 6, because here, the two counterarms are sprung apart to the maximum extent against the force of tension springs 21, and the counterarms are removed at the minimum distance from one another, that is, less than the diameter of the bottle. In the closed position, the gripping arms of clamps 5, 6 lie against the opposing circumferential parts of bottle 26 sitting in bin 3, with slight, elastic deflection, and fix the latter in bin 3. This gripping function is optimized by bulbous thickenings 37 at the ends of clamps 5, 6.

The lower end of each control shaft 18 projects somewhat out from lower ring 15. Two control levers 19, 20 are fastened in rectangular formation to these projecting ends. They work together with stops 22, 23 mounted fixedly on the underside of transport star 1 and form with them as well as with lifter 17 and control shafts 18, a control device 16 for clamps 5, 6. First stop 22 can be adjusted with regard to height and sits on the inner side of the rotational track of control shaft 18. If it is guided upwards into the movement track of inner control lever 19, it swings the latter out of the open position by 90° into the closed position when transport star 1 is rotated in the direction of the arrow. If stop 22 is guided out of the rotational track of inner control lever 19, the passing lifters 17 remain in the open position. They are clamped elastically into this position by spring element 21 between the counterarms of clamps 5, 6. Lifters 17 are also stabilized in the closed position, namely using notch-like recesses 33 in the counterarms of clamps 5, 6 which elastically clamp the edges of lifter 17 located in the closed position. Second stop 23 is rigidly mounted to the outer side of the rotational track of control shaft 18 or in the movement track of outer control lever 20 and swings all passing lifters 17 out of the closed position into the open position using outer control lever 20.

Using the control device 16 described above in detail, certain bottles 26 can be fixed in the relevant bins 3 in the terminal area of outlet arch 30, by means of the relevant clamps 5, 6. Then, they do not leave transport star 1 with the normal conveyor 27 driven in the direction of the arrow, like the unclamped bottles 26, but rather are transported to a second, not indicated conveyor for defective bottles 26.

If in transport star 1, bin 3 or clamps 5, 6 are damaged, the appropriate structural group consisting of two adjacent pins 10, 11, two bins 3, and two clamps 5, 6 are removed after loosening of the four bolts 34, sideways between rings 14, 15. Afterwards, the damaged elements are removed from pins 10, 11 and replaced by new elements. Then, the structural group is again pushed in between rings 14, 15 and fixed by four bolts 34. This process can be completed quickly and easily; the costs of the exchange parts are extremely low. To facilitate this procedure, the structural unit formed from the basic body 13 with pins 10, 11 and the elements stuck onto them can simply and easily be removed from hub 25 after loosening clamp devices 29. In a corresponding manner, an exchange of basic body 13 for another basic body which is oriented towards another bottle diameter is also possible.

Control device 16 does not have an inhibiting effect in the above-described processes because for one thing, stops 22, 23 both sit below transport star 1 and do not prevent it from being lifted off. For another, the counterarms of clamps 5, 6 can be removed uninhibitedly from lifter 17 located in the open position or can be reset on the latter, which is facilitated by the rounded shape of lifter 17 and rounding on the free ends of the counterarms of clamps 5, 6.

Transport star 2 according to FIGS. 3 and 4 in part matches transport star 1. In the following, only the deviations are described.

In transport star 2, individual pins 12 are fastened, so that they can be loosened, parallel to central axis 9 by means of two bolts 34 in each case, between rings 14 and 15, evenly distributed over the circumference. Each pin 12 has a square cross section in the lower and upper area of its length and in between, in the middle area of its length, has a circular cross section. Bin 4 is snapped on, so that it can be loosened, to each of the two areas with a square cross section. Bins 4 consist of separate molded plastic parts and have the same U-shape. Here, the two side limbs together with a lug in the middle limb form the actual star bin which is adapted to the diameter of container 26, and encircles the latter by not more than 180°. Due to the elasticity of the plastic selected, for example, a compound of PA and PE also preferred for bins 3 and clamps 5 to 8, an adaptation to different bottle diameters, within certain limits, is given, just as in the case of bins 3 of transport star 1. The middle limb of bins 4 has square borehole 35 which is opened towards the inner side of transport star 2 through slot 36. In the area of slot 36, clamp 4 is rounded so that it can be snapped onto pin 12, or can be removed from the latter, with application of the appropriate radial force. Through the square shape of pins 12 and borehole 35, the rotary securing of clamp 4 is given. The removal and snapping-on are further facilitated in that by a pressing together of the free ends of the side limbs of clamp 4, slot 36 is enlarged. Thus, for transport star 2, an exchange of individual clamps 4 can be performed particularly quickly and without tools, whereby pins 12 do not need to be removed.

In the middle, cylindrical area of each pin 12, two clamps 7, 8 are mounted closely above one another so that they can pivot. Except for the fact that these two clamps 7, 8 are mounted to the same pin 12, so that they can pivot, they correspond in their basic form and function as well as with regard to the structure of their control device 16 to clamps 5, 6 of transport star 1. The replacement of damaged clamps 7, 8 by a sidewards removal of involved pin 12 between rings 14 and 15 after loosening of the two bolts 34 also corresponds otherwise to the repair procedure already described for transport star 1.

Transport stars 38, 39, 40 according to FIGS. 5 to 9, have, like transport stars 1 according to FIGS. 1 and 2, a basic body 13 with an upper ring 14 and lower ring 15 which are connected with one another by several pairs of parallel pins 10, 11. In these three embodiment forms, the star bins are formed directly by the associated pairs of lever-like clamps or by the gripping tongs formed by them; U-shaped bins 3 or 4 are not present here.

For transport star 38 according to FIG. 5, a pivoting clamp 6 is mounted only on one pin 10. For the other clamp 41, no counterarm is present. Clamp 41, instead, has a borehole with a square cross section and, with the latter, is stuck on with torsional strength, but so that it can be loosened, to pin 11 provided with the corresponding square cross section. Both clamps 6, 41 have lugs 42 oriented radially outwards as stop for bottle 26, between which pressure spring 43 is inserted. The latter attempts to distance the gripping arms from one another or to open the gripping tongs formed by clamps 6, 41. Lifter 17 operates only pivoting clamp 6 and is stabilized in its closed position by its recess 33 in combination with the elastic deformation when encircling bottle 26. Stabilization in the open position is accomplished by pressurized spring 43.

For transport star 39 according to FIGS. 6 and 7, pivoting clamp 5, 6 is mounted on each pin 10, 11. Both clamps 5, 6 are provided with recesses 33 on the counterarms as well as with lugs 42 and are prestressed by pressurized spring 43 in the open direction. Each clamp 5, 6 is assigned its own lifter 44, 45. Lower lifter 45 extends approximately over half of the distance between rings 14, 15 and is mounted in lower ring 15; upper lifter 44 extends approximately over the other half of the distance between rings 14, 15 and is mounted so that it can be rotated in upper ring 14. Lifters 44, 45 and their rotational axes are concentric with respect to one another. Each of them has its own control device 16a, 16b which is mounted appropriately over or below transport star 39. The construction of control devices 16a, 16b corresponds essentially to that of control device 16 according to FIGS. 1 and 2. In this manner, each lifter 44, 45 can be controlled independently and thus each clamp 5, 6 can open or close independently of the other clamps. For this, it is required that lifters 44 be designed asymmetrically, as indicated in FIG. 6, so that they engage only the assigned clamp. Instead, it is also possible to use identical, symmetrical lifters if the clamps are freely cut, reciprocally, in the area of the lifter. With such an arrangement, a targeted opening and closing of the previous or successive clamps 5, 6 is possible, during gripping and releasing, which is particularly advantageous with a change of interval of bottles 26 during input and output from transport star 39.

In transport star 40 according to FIGS. 8 and 9, on the other hand, a pivoting clamp 46, 47 is mounted in the counterarm, with lug 42 and at least one recess 33, so that it can be rotated, on each pin 10, 11. However, there is neither tension spring 21 nor pressurized spring 43. Instead, clamps 46, 47 are stabilized in the open position by driver 48 connected, with torsion strength, to lifters 17 which control the two clamps. The driver is fastened to control shaft 18 of lifter 17 and has the form of a double-lever with U-shaped longitudinal axis opening downwards. The horizontal limb of driver 48 runs through a cleavage between upper ring 14 and the upper front face of clamps 46, 47. The two side limbs which are at a distance downwards overlap the outer sides of the counterarms of clamps 46, 47. These outer sides have a different, curved course designed so that driver 48 presses apart or holds the counterarms of clamps 46, 47 in a transition from the closed position into the open position of lifter 17, so that the gripping tongs formed by the clamps are or remain opened. In the closed position of the gripping tongs, forced by lifter 17, driver 48 has no function. This transport star 40 has especially high operating safety because functional disorders through break of the springs are eliminated with certainty. Therefore, it is particularly well suited as a replacement for a normal input star or output star of a container handling machine and makes possible the elimination of guidance arches.

In order to make possible a better adaptation to the shape of the container, the two clamps 46, 47 which essentially cover the entire distance between rings 14 and 15 are widened in the area of the gripping arm as well as provided with a slot 49 and relief 50. The clamp, not shown, of a preceding or successive transport star can engage this relief 50.

Transport star 55 according to FIGS. 10 and 11 matches transport star 40 according to FIGS. 8 and 9 with regard to the shape of the clamps 46, 47 and control devices 16, 17, 18, 48. However, here the associated pins 10, 11 are fastened, so that they can be loosened, by means of bolts 34 between the two parallel plates of a single bearing box 51. Control shaft 18 with lifter 17 and driver 48 is also mounted, so that it can be rotated, in this bearing box 51 which sits between rings 14, 15 of hull 13. Bearing box 51 is mounted, so that it can be pivoted, in rings 14, 15 of basic body 13 by means of axis 56 to which both of its plates are fastened, namely, parallel to the central axis 9 of basic body 13.

At the upper end of axis 56 which projects from upper ring 14, a lever with a curve roller 54 is fastened. This engages stationary, self-contained control curve 53. The drive device (52) thus formed controls the pivoting or placement of bearing body 51 relative to basic body 13 when the latter is rotated in the direction of the arrow. Each bearing body 51 can be provided with its own roller lever and a group of bearing bodies 51 can also be provided with a common roller lever. The second case is shown in FIG. 10. Here, for example, two adjacent bearing bodies 51 are connected with one another in an articulated manner by rod 57, so that they can be pivoted jointly in each case. One of the two bearing bodies 51 is fitted with a curve roller 54 which traces stationary control curve 53. This is designed so that both bearing bodies 51 with clamps 46, 47 are pivoted in the direction of the arrow when two conveyor belts 58, 59 mounted radially with respect to the central axis 9 pass opposite the rotational direction of basic body 13. In this way, bottles 26 can be transferred to conveyor belts 58, 59 practically stationary, while the conveyor belts are driven continuously in the direction of the arrow. Transport star 55, therefore, serves to divide containers 26 onto several tracks. The simultaneous opening of the two gripping tongs can be achieved without any problem by stops 23 adjusted or moved vertically accordingly.

I claim:

1. Transport star for containers comprising a rotatable basic body and several gripping tongs mounted on the circumference of said basic body, formed in each case by two pivoting clamps, whereby said clamps are designed as double-levers with radially outward-facing gripping arms and radially inward-facing counterarms engaged by a control device with a snap body, mounted adjustably on said basic body, forcing apart said counterarms in the closed position, said control device (16) having at least one lifter (17, 44, 45) mounted in said basic body (13), so that it can be rotated, said lifter sitting between said counterarms of associated said clamps (5, 6; 7, 8; 46, 47) and forcing apart said two adjacent counterarms in at least one angular or closed position and allowing said counterarms to approach one another in at least one other angular or open position.

2. Transport star according to claim 1, wherein said clamps (5, 6; 7, 8; 46, 47) are mounted, so that they can be pivoted, on pins (10, 11, 12) fastened to said basic body (13).

3. Transport star according to claim 2, wherein said basic body (13) has two parallel disks and/or rings (14, 15) between which said pins (10, 11, 12) are fastened, so that said pins can be loosened, with said clamps (5, 6; 7, 8; 46, 47), which are mounted on said pins.

4. Transport star according to claim 2 or 3, wherein said lifter (17, 44, 45) is formed essentially by two parallel flattened areas of a control shaft (18) which is mounted, so that it can be rotated, parallel to said pins (10, 11, 12) in said basic body (13).

5. Transport star according to claim 1, 2, or 3, wherein at least one control lever (19, 20) is fastened to a control shaft (18) of said lifter (17, 44, 45), wherein said control lever, together with stops (22, 23) mounted stationary relative to a rotational track of said transport star (1, 2, 38, 39, 40, 55), cause a controlled displacement of said lifter (17, 44, 45), and thus, an opening or closing of said clamps (5, 6; 7, 7; 46, 47).

6. Transport star according to claim 2 or 3, wherein said basic body (13) forms a circular structural unit with said pins (10, 11, 12) and said claims (5, 6; 7, 8; 46, 47) fixed on them, and said structural unit is fastened, so that it can be loosened, to a hub (2) equipped with one or more radial arms (24).

7. Transport star according to claim 1, 2, or 3, wherein a tension spring (21) is stretched over said counterarms of two associated said clamps (5, 6; 7, 8).

8. Transport star according to claim 1, 2, or 3, wherein said counterarms of two associated said clamps (5, 6; 7, 8; 46, 47) are provided with recesses (33) which stabilize said lifters (17, 44, 45) in the closed position.

9. Transport star according to claim 1, 2, or 3, wherein said clamps (5, 6; 7, 8; 46, 47) consist of plastic.

10. Transport star according to claim 1, 2, or 3, wherein of two respective said clamps which form one pair of said gripping tongs, only one of said clamps, (6) is mounted so that it can be pivoted and is controlled by said lifter (17), whereas the other of said clamps, (41) is fixed, with torsional strength, to said basic body (13).

11. Transport star according to claim 1, wherein of two respective said clamps which form one pair of said gripping tongs, each said clamp (5, 6) can be controlled independently by its own said lifter (44, 45).

12. Transport star according to claim 11, wherein said two lifters (44, 45) are mounted coaxially over one another in said basic body (13) by said two clamps (5, 6) which form one pair of said gripping tongs.

13. Transport star according to claim 1, and at least one driver (48) connected, with torsional strength, with one said lifter (17), wherein said driver stabilizes at least one associated said clamp (46, 47) in the open position.

14. Transport star according to claim 13, wherein said driver (48) engages at least one counterarm of said clamp (46, 47) when said lifter (17) assumes its open position.

15. Transport star according to claim 14, wherein said driver (48 is shaped like a U and engages, with its free limbs, the outer side of two respective said clamps (46, 47) which form one pair of said gripper tongs.

16. Transport star according to claim 15, wherein said counterarms of said respective two clamps (46, 47) which form one pair of said gripper tongs have different curved shapes on the outside.

17. Transport star according to claim 1 wherein said respective two clamps (46, 47) which form one pair of said gripper tongs and the associated said lifter or lifters (17) are taken up in their own bearing body (51) which in turn is mounted in said basic body (13) so that said bearing body can be pivoted, and is connected with a drive device (52) for pivoting movement.

18. Transport star according to claim 17, wherein said bearing body (51) has two parallel plates between which said clamps (46, 47) and said lifters (17) are mounted.

19. Transport star according to claim 17 or 18, wherein said drive device (52) has at least one fixed control curve (53) and at least one curved roller (54) connected with at least one said bearing body (51).

20. Transport star according to claim 17 or 18, wherein several said bearing bodies (51) are connected with one another in an articulated manner for common pivoting.

\* \* \* \* \*